United States Patent [19]

Mayer

[11] 4,414,613
[45] Nov. 8, 1983

[54] RECTANGULAR SEAL BEAM LAMP AND SUPPORT WITH HALOGEN BULB

[75] Inventor: William R. Mayer, Rochester, Ill.

[73] Assignee: Stewart-Warner Corporation, Chicago, Ill.

[21] Appl. No.: 241,395

[22] Filed: Mar. 6, 1981

Related U.S. Application Data

[63] Continuation-in-part of Ser. No. 220,248, Dec. 23, 1980, Pat. No. 4,357,651.

[51] Int. Cl.³ ............................................ F21Y 29/00
[52] U.S. Cl. .................................. 362/267; 362/306; 362/350; 362/396; 362/310; 362/369; 362/421; 362/343; 362/372; 339/93 C; 339/144 R
[58] Field of Search ................ 362/61, 267, 307, 306, 362/310, 343, 350, 372, 396, 421; 339/28, 93 C, 144 R; 313/318

[56] References Cited

U.S. PATENT DOCUMENTS

| | | | |
|---|---|---|---|
| 2,883,132 | 4/1959 | Neher | 339/93 C X |
| 3,014,153 | 12/1961 | Gardner | 362/267 X |
| 3,048,673 | 8/1962 | Kirk | 339/93 X |
| 3,089,027 | 5/1963 | Horan | 362/267 X |
| 3,784,807 | 1/1974 | Boekkooi et al. | 362/267 X |
| 3,898,451 | 8/1975 | Murphy et al. | 362/267 X |
| 4,012,658 | 3/1977 | Vause | 339/144 R X |
| 4,210,841 | 7/1980 | Vodicka et al. | 362/267 X |
| 4,240,131 | 12/1980 | Albrecht | 362/267 X |
| 4,245,281 | 1/1981 | Ziaylek, Jr. | 362/267 X |
| 4,254,358 | 3/1981 | Saito | 339/144 X |
| 4,277,818 | 7/1981 | Urbanek et al. | 362 267 X/ |
| 4,287,448 | 9/1981 | Bradley | 339/93 X |
| 4,300,189 | 11/1981 | Shanks | 362/267 |
| 4,319,156 | 3/1982 | Bienvenue et al. | 362/267 X |

*Primary Examiner*—Peter A. Nelson
*Attorney, Agent, or Firm*—Augustus G. Douvas

[57] ABSTRACT

A rectangular seal beam lamp unit with a high intensity halogen bulb, particularly adapted for utility vehicles, that is self-supporting without requiring any special mounting fixtures on the vehicle, and includes an entirely plastic reflector having an integral forwardly projecting hood that defines in part a recess that receives a rectangular lens sealed by an epoxy material. The halogen bulb has two rearwardly extending lead wires that are embedded in a synthetic rubber material in a recess in the rear of the reflector to assist in shock mounting the bulb. The bulb is primarily supported by a pair of curved resilient connector rods that are welded to the bulb lead wires at one end and curve downwardly to a connector and terminal assembly at the lower rear of the reflector. A strap surrounds the halogen bulb and is fixed to one of the resilient connector rods to support and shock mount the bulb in the reflector. The terminal assembly includes a pair of eyelets into which the ends of the terminal rods are soldered, that extend through and are staked to terminals in vertical slots on the reflector. Integral projections on the reflector extend rearwardly through the terminals to assist in holding them against the reflector. A universal mount for the lamp includes an integral downwardly extending spherical projection on the reflector.

19 Claims, 12 Drawing Figures

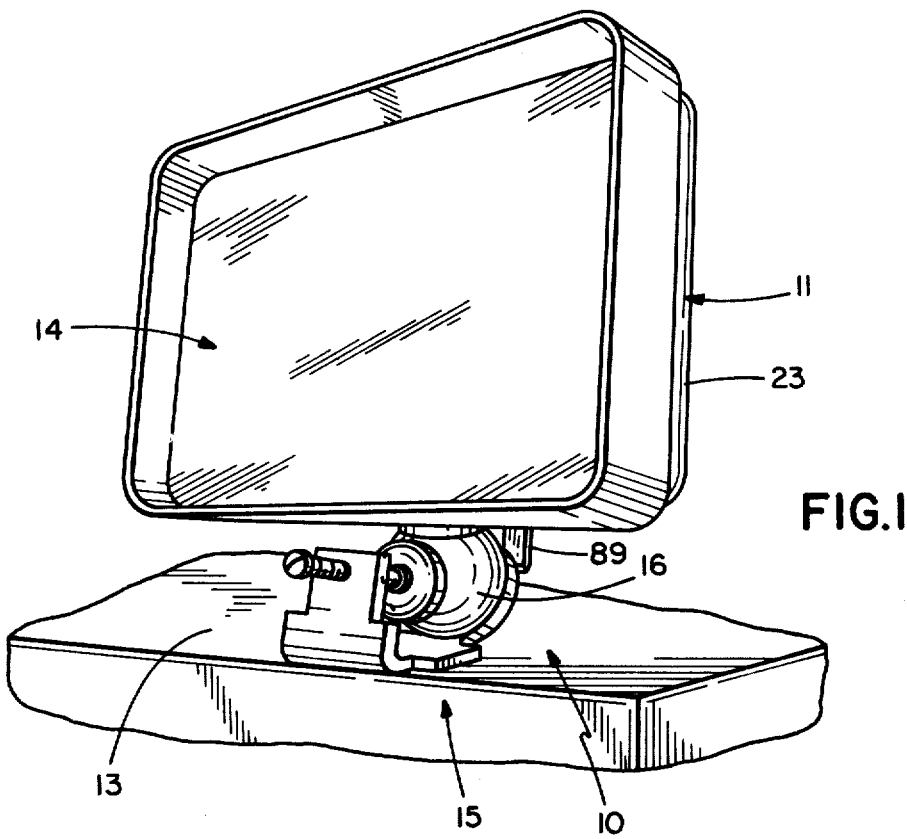
FIG.1
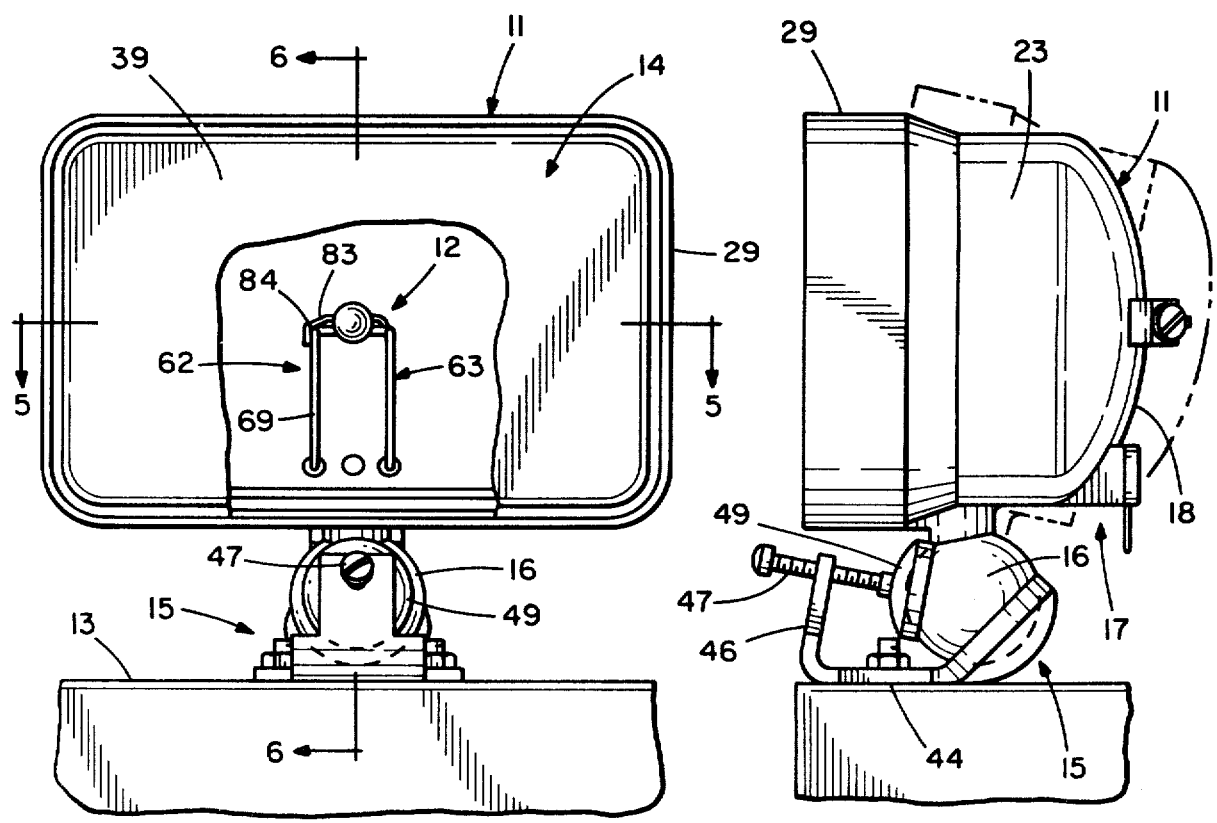
FIG.2
FIG.3

RECTANGULAR SEAL BEAM LAMP AND SUPPORT WITH HALOGEN BULB

RELATED APPLICATION

This application is a continuation-in-part of the William R. Mayer U.S. application entitled "Rectangular Seal Beam and Universal Support Assembly", Ser. No. 220,248, filed Dec. 23, 1980, now U.S. Pat. No. 4,357,651.

BACKGROUND OF THE INVENTION

Vitreous glass seal beam lamp units have been used for vehicle lighting since at least as early as the 1930's in the United States. These lamps include a parabolic reflector having a highly mirrorized inner surface that usually has two openings in the base portion that receive connectors for a filament aligned within the reflector. The reflector is enclosed by a circular convex lens also constructed of glass that is located with respect to the reflector by various types of integral locating tabs and is fused to the reflector by heat fusion. The connector assemblies are also connected to the reflector by a heat fusion process, and the content and pressure of gas within the reflector-lens envelope is carefully controlled through a filling tube formed integrally with the rear of the reflector that is fused after the evacuation and/or inert gas filling of the lamp envelope.

Such a seal beam lamp unit is shown and described in the D. K. Right U.S. Pat. No. 2,148,314 dated Feb. 21, 1939.

These seal beam lamp units, which by themselves are replaceable after the filaments burn out, require complicated locking rings and adjustment assemblies permanently carried by the associated vehicle to hold the lamp units in proper position. The locking rings frequently include adjusting brackets for varying the attitude of the lamp unit to properly direct the lamp's beam to effect the desired lamp alignment.

These prior mounting arrangements and also the lamp units themselves, do not have any provision for shock-mounting the lamp or lamp filaments and efforts to devise them to attain shock-absorbing characteristics have been largely unsuccessful without eliminating the beam adjustment function of the mount.

With the advent of rectangular seal beam lamp units, a shock-absorbing mount has been devised for a seal beam lamp that completely shock-mounts the lamp while at the same time permits limited attitude adjustments of the lamp's beam, namely a shock-absorbing mount for a rectangular seal beam lamp shown in the inventor's co-pending application Ser. No. 148,698 filed May 12, 1980 now U.S. Patent No. 4,345,307 entitled "Rectangular Headlamp Retainer" assigned to the assignee of the present invention. Even this mount, however, is quite costly and therefore forms a part of the vehicle itself and is not replaced at lamp burnout with the seal beam lamp unit itself.

It has been suggested that the reflector of a rectangular seal beam lamp be constructed of a plastic material and that support flanges be formed integrally with the plastic material to eliminate the complicated mounting flanges and rings required in prior lamp units. Such a construction is shown in the Thomas T. Talon et al U.S. Pat. No. 4,188,655. This patent discloses three integral flanges on a plastic reflector that cooperate with three adjusting assemblies mounted to the vehicle that permit adjustment of the lamp beam in two orthogonal planes. While such an arrangement is suitable for many passenger automobile applications, it remains quite costly because of the three separate adjusting mechanisms required, and it does not provide for, nor can it accommodate any known effective shock-absorbing mechanism.

It is a primary object of the present invention to provide a simplified replaceable seal beam lamp and support unit for utility vehicles that does not have the problems and disadvantages noted above in prior art seal beam lamp units.

SUMMARY OF THE PRESENT INVENTION

According to the present invention, a rectangular seal beam halogen bulb lamp unit is provided that is self-supporting and does not usually require any special mounting fixtures on the vehicle to which it is attached. The lamp unit is particularly designed for rugged use in utility vehicles, either on or off the road, in part through the provision of a unique shock-absorbing mount for the halogen bulb within the lamp unit. The lamp unit is designed so that it may be manufactured at a cost low enough to enable the entire unit to be discarded at the time the halogen bulb burns out or fails.

Toward these ends, the lamp includes a one piece reflector molding constructed of an impact resistant plastic that has an integral ball extending downwardly forming part of a single point universal support assembly. The plastic reflector has a highly mirrorized coating on a paraboloidal inner surface that reflects light from the halogen bulb through a rectangular lens constructed of either plastic or vitreous glass material. An important aspect of the invention is that the reflector has an integral forwardly extending hood that minimizes light scattering from the high intensity halogen bulb in a very inexpensive and effective fashion. This hood also defines part of a rectangular forwardly facing recess in the reflector that receives a flange on the rectangular lens. This flange and an associated rim on the lens are epoxied into the reflector recess eliminating the costly fusion techniques that require careful control heretofore employed in fusing lens to vitreous reflectors.

The halogen bulb, by itself conventional, has a pair of small gauge rearwardly extending lead wires that are embedded into a synthetic rubber material, such as silicone rubber, in an integral circular recess formed centrally in the rear of the reflector. This synthetic rubber embedding technique serves to maintain the aligned position of the halogen bulb within the reflector and also assists in providing a shock mount for the bulb.

A terminal assembly is provided in the lower rear of the plastic reflector that includes downwardly projecting vertical terminals adapted to be received in a vehicle carried terminal connector. The halogen bulb is primarily supported and energized by a pair of curved resilient rods that are welded to the reflector lead wires and extend forwardly along the sides of the bulb and then curve downwardly to the terminal assembly. These rods are electrically conductive and provide the electrical paths to the bulb. A strap is attached to the base of the bulb and is welded to one of the rods to provide the main support for the bulb on the rods, and the resiliency of the rods provides vibration dampening for the bulb.

The terminal assembly includes a pair of eyelet connectors that extend through and are epoxied into apertures in the lower rear wall of the reflector that receive and are soldered to the ends of the connector rods. The ends of these eyelet connectors project through openings in the terminals and are staked over to hold the terminals in position. To assist in maintaining the position of the terminals against the back of the reflector, integral projections on the rear of the reflector extend through secondary openings in the terminals and are heat fused over the terminals to hold them in position.

BRIEF DESCRIPTION OF THE DRAWINGS

FIG. 1 is a perspective view of the present rectangular seal beam lamp unit;

FIG. 2 is a front view, with the lens partly broken away, of the rectangular seal beam lamp unit illustrated in FIG. 1;

FIG. 3 is a side view of the rectangular seal beam lamp unit illustrated in FIG. 2;

DETAILED DESCRIPTION OF THE PREFERRED EMBODIMENT

Figure 4:
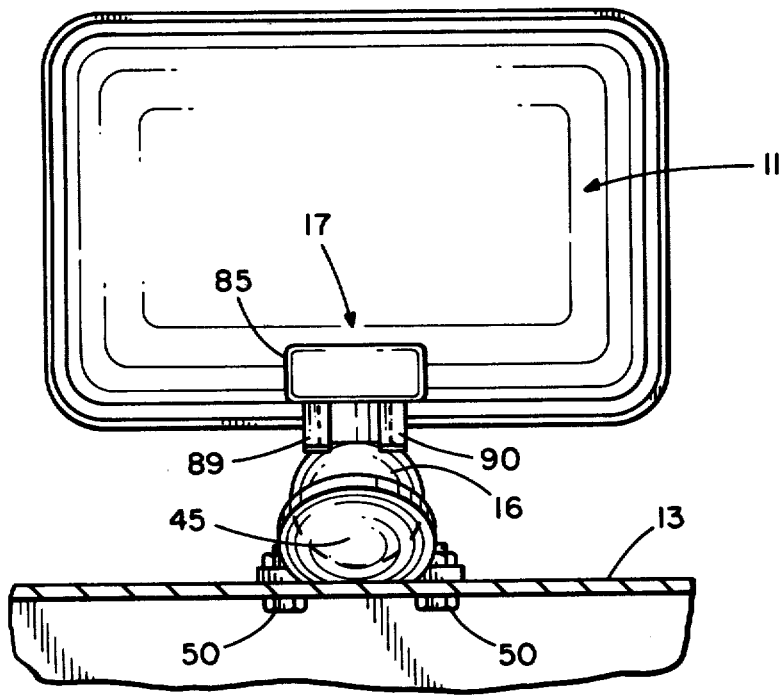
FIG. 4 is a rear view of the rectangular seal beam lamp unit illustrated in FIGS. 1 to 3.

Referring to the drawings and particularly FIGS. 1 to 3, a rectangular seal beam lamp unit 10 is illustrated fixed to a vehicle panel 13 without any special mounting brackets on the vehicle panel, and it is seen to generally include a one-piece molded plastic reflector 11 having a halogen bulb assembly 12 mounted therein, closed by a rectangular frontal lens 14, and having a universal mounting assembly 15 defined in part by a spherical projection 16 formed integrally with the reflector 11.

Figure 6:
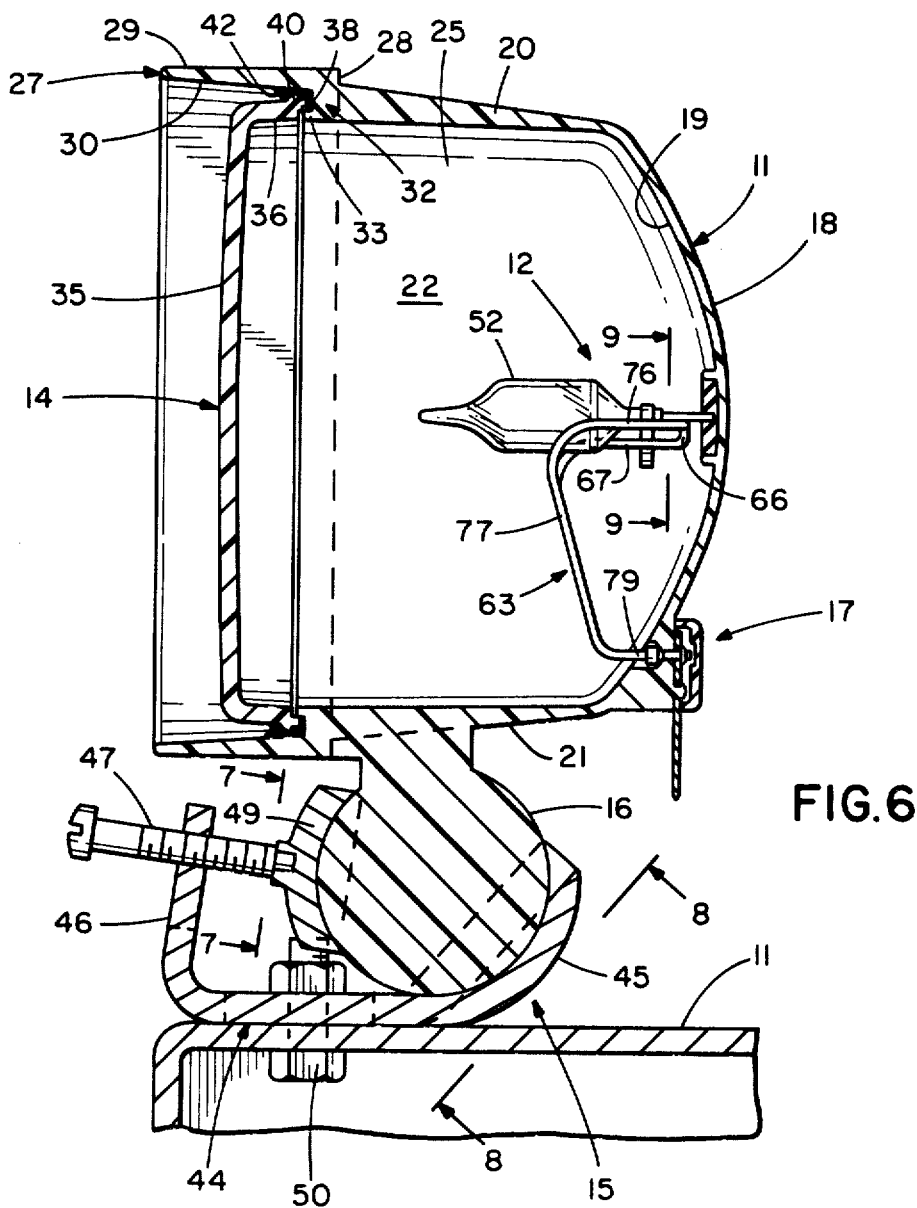
FIG. 6 is an enlarged vertical section of the rectangular seal beam lamp unit taken generally along lines 6—6 of FIG. 2.
Figure 9:
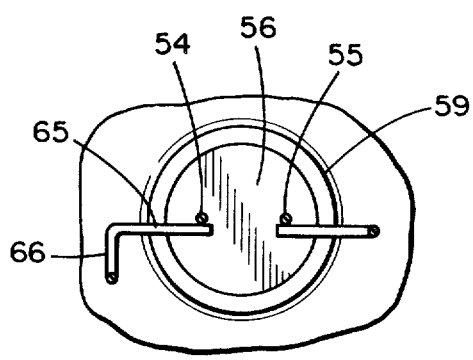
FIG. 9 is a fragmentary section of the embedded mounting of the halogen bulb lead wires taken generally along line 9—9 of FIG. 6.
Figure 7:
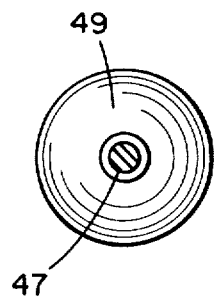
FIG. 7 is a fragmentary view of the universal mounting assembly for the lamp unit taken generally along lines 7—7 of FIG. 6.
Figure 8:
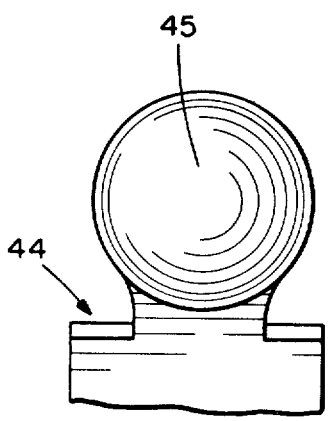
FIG. 8 is a fragmentary view of the universal mounting assembly taken generally along line 8—8 of FIG. 6.

As seen more clearly in FIG. 6, the rectangular lamp unit 10 includes a terminal assembly 17 at the lower rear of the reflector 11 that is adapted to be plugged into a two or a three hole terminal connector for supplying current to the halogen bulb assembly 12.

Viewing the FIGS. 1 to 3 and 6, the reflector 11 is seen to be a generally rectangular one-piece plastic molding, constructed of an impact resistant plastic. The reflector 11 has a paraboloidal rear wall 18 that has a highly mirrorized reflective coating on its inner surface 19 that may be formed by a variety of commercially known mirrorizing techniques. The reflector 11 has slightly diverging top wall 20, bottom wall 21, side wall 22 and side wall 23 extending forwardly from the rear wall 18. Walls 20, 21, 22 and 23 have inner surfaces 25 merging with inner surface 19 of rear wall 18 that are also mirrorized in the same fashion.

An integral hood 27 projects forwardly from the walls 20, 21, 22 and 23 and extends a significant distance forwardly of the lens 14 to reduce scattering of the high intensity light from the halogen bulb assembly 12. Hood 27 is rectangular in configuration and is defined in part by a peripheral shoulder 28 extending laterally outwardly from walls 20, 21, 22, 23, and it has an outer wall 29 parallel to the optical axis of the reflector 11 and an outwardly tapered inner wall 30 providing an outwardly tapering configuration to the hood 27 itself when viewed in the cross-section of FIG. 6.

The inner wall 30 of hood 27 forms part of a lens holding recess 32 for the lens 14. The recess 32 includes a peripheral lip 33 extending axially forwardly of the reflector walls 20, 21, 22 and 23.

The lens 14 is generally rectangular in configuration and may be constructed of a clear or translucent vitreous or plastic material, and is seen to include a rectangular front wall 35 and a depending peripheral wall 36 having a reduced thickness flange 38 received over and loosely engaging the lip 33 of recess 32 in the reflector 11. The depending wall 36 of the lens also has an outwardly projecting quarter round peripheral lip portion 40 adjacent the flange 38. The lens 14 is held to the reflector 11 by epoxy adhesive material 42 that fills recess 32 adhering to the rear and radially outer surfaces of flange 38, both sides of the quarter round lip portion 40 as well as a substantial portion of the surface 30 of hood 27. This securely locks and seals the lens 14 to the reflector 11 and aligns the lens with respect to the reflector in an accurate but simple fashion.

The universal mounting assembly 15 is seen to include a generally U-shaped base bracket 44 having a spheroidal portion leg 45 that engages one side of spherical projection 16 on reflector 11, and a second leg 46 that threadedly receives an actuating rod 47 rotatably carrying a spheroidal clamping member 49 generally diametrically opposed to the spheroidal bracket portion 45 with respect to the center of spherical projection 16. Bracket 44 is clamped to vehicle panel by fasteners 50.

By loosening actuator rod 47 and retightening it against the spherical projection 16 the lamp unit 10 may be positioned in any positioned with respect to two orthogonal planes intersecting the optical axis of the lamp unit, within the limitations imposed by the female connector (not shown) into which the terminal assembly 17 is inserted.

The halogen bulb assembly 12 is shock mounted within the reflector 11 to increase bulb life and also to maintain the aligned position of the bulb assembly within the reflector for longer periods. The halogen bulb assembly 12 is seen to include a commercially available tungsten halogen bulb 52 aligned on the optical axis of the paraboloidal surface 19 of reflector 11, and it has a pair of parallel flexible lead wires 54 and 55 extending rearwardly therefrom. The ends of the lead wires 54 and 55 are embedded into a synthetic rubber material 56 contained within a recess 57 in the central rear of the reflector rear wall 18 defined by an integral annular rim or flange 59. The synthetic rubber material 56 may be silicone rubber for example. The embedding of the lead wires 54 and 55 of the halogen bulb in the synthetic rubber material 56 assists in providing a resilient shock mount for the bulb 52 and in aligning the optical axis of the bulb 52 with respect to the axis of the paraboloidal reflector surface 19.

Curved resilient spring connector rods 62 and 63 provide the primary support for the bulb 52 and also provide conductive paths between the bulb and the terminal assembly 17. The rods 62 and 63 are steel rods with a copper flash coating that have spring characteristics so that the bulb 52 may vibrate with respect to the reflector and return to its originally adjusted or aligned position within the reflector when vibration ceases.

Figure 11:
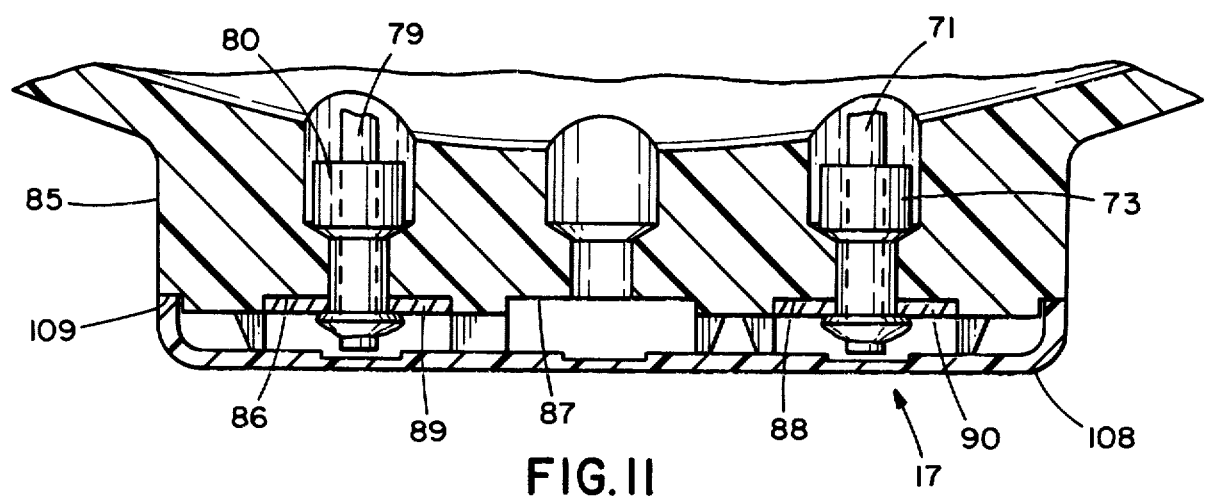
FIG. 11 is a longitudinal section of the terminal assembly taken generally along line 11—11 of FIG. 10.

Rod 62 has a horizontal leg portion 65 welded to bulb lead wire 54 connected to a short vertical leg portion 66, a forwardly extending leg portion 67 and a curved downwardly and rearwardly extending leg portion 69. Leg portion 69 continues to an end portion 70 that extends within and is connected to an eyelet 73 in the terminal 17 as seen in FIG. 11.

Figure 12:
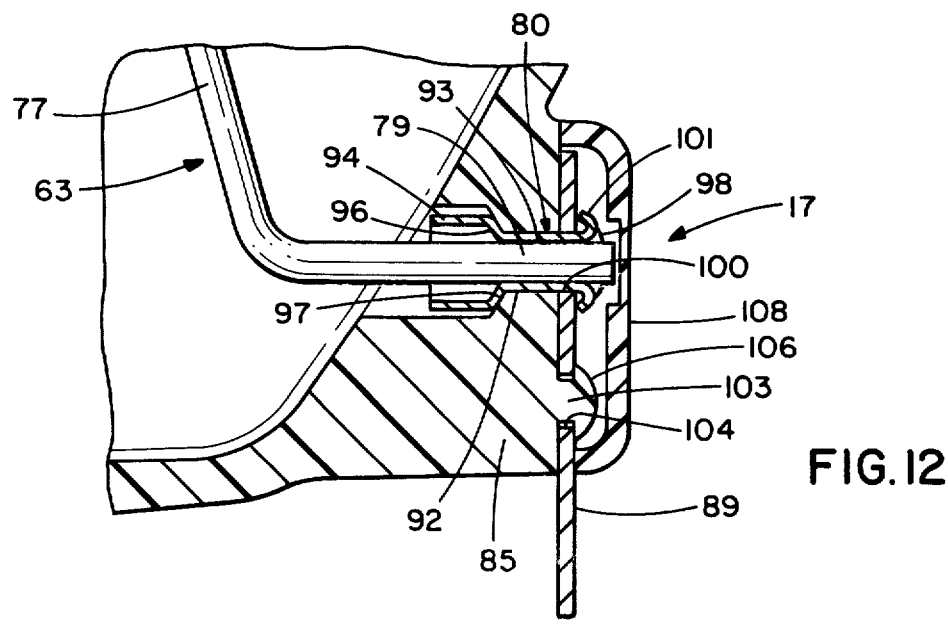
FIG. 12 is a fragmentary cross-section of the terminal assembly taken generally along line 12—12 of FIG. 10.

The other connector rod 63 has a horizontal leg portion 75 welded to bulb lead wire 55, a forwardly extending portion 76 and a curved downwardly and rearwardly extending portion 77. Portion 76 continues to an end portion 79 that extends within and is connected to an eyelet 80 in terminal 17 as seen in FIGS. 11 and 12.

Figure 5:
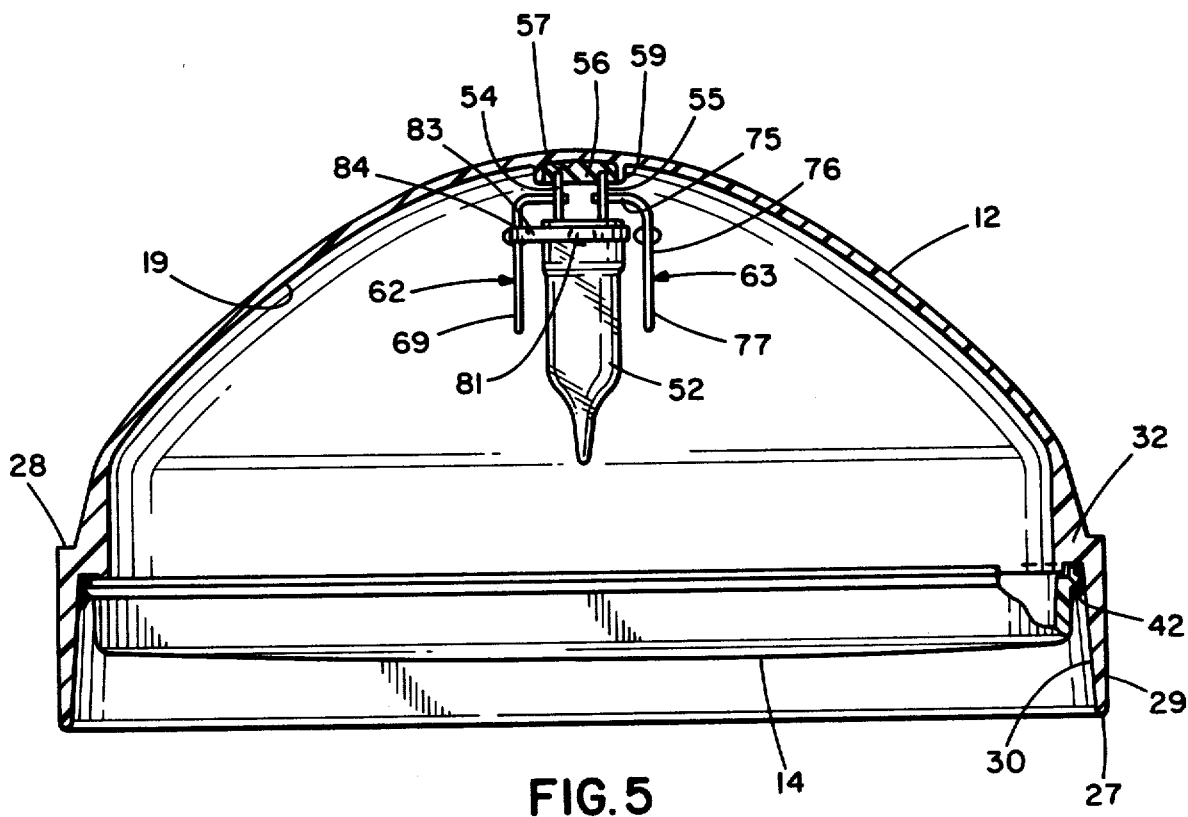
FIG. 5 is an enlarged longitudinal section of the rectangular seal beam lamp unit taken generally along line 5—5 of FIG. 2.

The bulb 52 is connected to and supported by the connector rod 62 by a strap 81 that surrounds the base of the bulb 52 and has an outwardly extending end 83 that is welded to the connector rod 62 at 84 as seen in FIGS. 2 and 5. Thus the rods 62 and 63 provide a resilient shock support for the bulb 52 and also the conductive paths to and from the halogen bulb.

The terminal assembly 17 is a three terminal connector although only two are utilized in the embodiment of the invention illustrated in the drawings.

As seen clearly in FIGS. 4, 6, 10 and 11, the terminal assembly 17 is seen to include a rectangular lug 85 formed integrally with the plastic reflector 11 that has three vertically arranged parallel slots 86, 87 and 88 therein with slots 86 and 88 receiving vertical terminals 89 and 90. A third terminal would be provided in slot 87 for the three connector terminal arrangement.

As each of the eyelets 73 and 80 along with their connections to the connector rod 62 and 63 and the terminals 89 and 90 is identical, reference will be made to the construction of the eyelet 80 and its associated parts as shown in FIG. 12 with the understanding that the eyelet 73 and its connection to the associated parts are identical.

Viewing FIG. 12, the eyelet 80 is seen to include a reduced central portion 92 epoxied to a bore 93 in terminal lug 85. Eyelet 80 has an enlarged inner portion 94 connected to the central portion 92 by a frusto-conical portion 96 seated against tapered counterbore portion 97 in bore 93. Frusto-conical portion 96 axially positions the eyelet 80 with respect to the lug 85.

The rod end 79 is soldered to the outer end of the eyelet 80 by solder material indicated at 98 providing good electrical contact between the rod 63, eyelet 80 and terminal 89, all of which are constructed of electrically conductive materials. The reduced central portion 92 of eyelet 80 extends through an upper hole 100 in the terminal 89 and is deformed over the terminal as indicated at 101 to hold the terminal in slot 86 and also to provide good electrical contact with the terminal. An integral post 103 extends from reflector lug 85 within terminal slot 86 and projects through a second hole 104 in the termiinal. Post 103 has a head 106 formed by heat deformation that engages the outside of the terminal 89 and locks it properly in position. A similar post 108 is provided for terminal 90.

Figure 10:
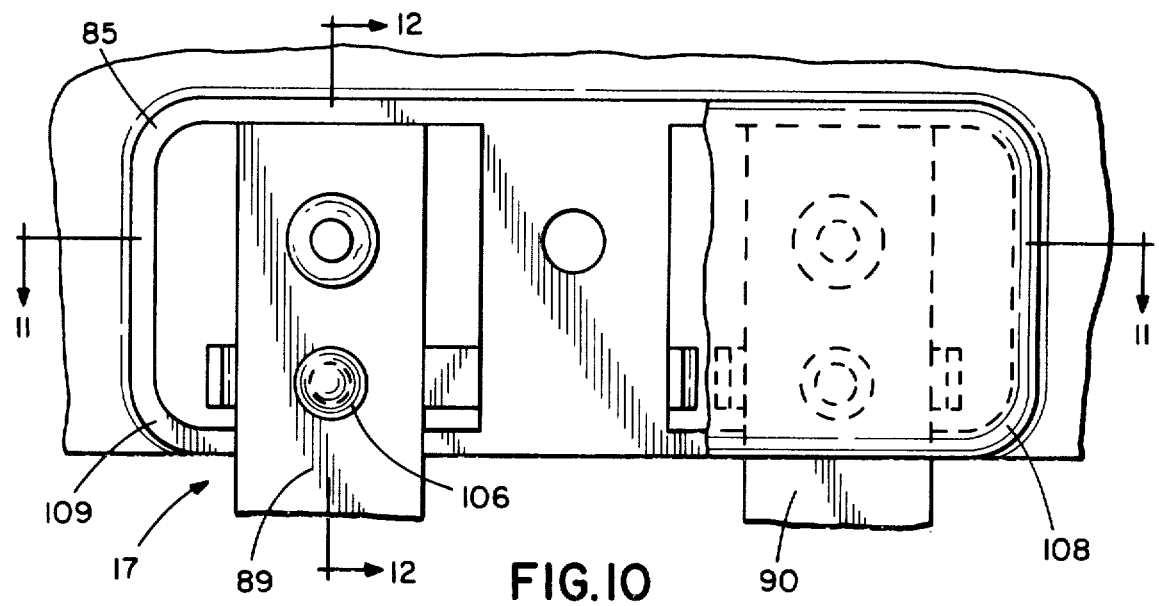
FIG. 10 is an enlarged fragmentary rear view of the terminal assembly with its cover partly broken away.

As seen in FIGS. 10, 11 and 12, a rectangular cup-shaped plastic cover 108 is provided for lug 85 that fits in a peripheral recess 109 on the lug 85 and is held therein by an epoxy adhesive.

I claim:

1. A disposable seal beam lamp unit, comprising; a generally rectangular reflector constructed of plastic having a paraboloidal interior reflective surface, a fastener receiving projection integrally molded with and extending from the reflector to receive fastener means to provide the sole support for the lamp unit, a connector opening in the rear of the reflector, a halogen bulb assembly having connector means extending through the connector opening, epoxy material between the connector means and the connector opening for fastening the halogen bulb assembly within the reflector, said reflector having a peripheral forwardly opening recess integrally formed therein, a generally rectangular lens having a peripheral rearwardly extending flange mounted in the forwardly opening recess in the reflector, and epoxy adhesive in the reflector recess engaging the flange for bonding the lens to the reflector said reflector, having an integrally molded forwardly extending peripheral hood directing adjacent the integral recess and surrounding the lens for limiting stray light and covering the epoxy in the lens recess.

2. A disposable seal beam lamp unit, as defined in claim 1, wherein said hood forms at least a part of the recess in the reflector for receiving the lens flange.

3. A disposable seal beam lamp unit, as defined in claim 1, wherein the reflector has an outwardly extending lip adjacent the flange that defines a pocket in the reflector recess, said pocket being filled with said epoxy adhesive.

4. A disposable seal beam lamp unit, as defined in claim 3, wherein said epoxy adhesive engages both sides of the reflector lip and at least one side of the flange.

5. A disposable seal beam lamp unit, as defined in claim 1, wherein there are two connector openings in the rear of the reflector, said bulb assembly including two connector eyelets extending into the two reflector openings, and epoxy adhesive on the two connector eyelets for holding the bulb assembly in position in the reflector.

6. A disposable seal beam lamp comprising; a generally rectangular reflector constructed of plastic having a paraboloidal interior reflective surface, an integral mounting projection extending from the reflector for supporting the lamp unit including a spherical ball molded integrally with the plastic reflector, a connector opening in the rear of the reflector, a halogen bulb assembly having connector means extending through the connector opening, a forward opening integral peripheral recess in the plastic reflector, a generally rectangular lens having a flange extending into the plastic reflector recess and attached to the open end of the reflector, and epoxy adhesive in the recess for bonding the lens to the reflector.

7. A disposable seal beam lamp comprising; a generally rectangular reflector constructed of plastic having a paraboloidal interior surface, a fastener receiving projection integrally molded with a fastener receiving projection and extending from the reflector to receive fastener means to provide the sole support for the lamp unit, a connector opening in the rear of the reflector, a halogoen bulb assembly having connector means extending through the connector opening, said reflector having a peripheral forwardly opening recess integrally formed therein, and a generally rectangular lens attached to the open end of the reflector with a peripheral flange extending into the reflector recess, said reflector having an integrally molded forwardly extending peripheral hood surrounding the lens and extending forwardly from the lens.

8. A disposable seal beam lamp unit, as defined in claim 7, including a peripheral flange on the lens, a recess in the reflector for receiving the flange, epoxy adhesive in the reflector recess engaging the lens flange for bonding the lens to the reflector, a lip on the lens extending outwardly from the flange, said epoxy adhesive engaging both sides of the lip to secure the lens in position.

9. A replaceable rectangular seal beam lamp unit, comprising; a plastic reflector having an interior mirrorized paraboloidal reflective surface, a lens mounted on the reflector, a halogen bulb adapted to be mounted in the reflector having a pair of lead wires extending rearwardly therefrom, a pair of connector members mounted in the rear of the reflector, a pair of terminals on the outside of the reflector connected to the connector members, a pair of conductive resilient connector rods attached to the halogen bulb wires at one end and the connectors at their other ends to provide conductive paths relative to the halogen bulb, and a support member between at least one of the connector rods and the bulb to support the halogen bulb on the one resilient connector rod to provide a shock mount for halogen bulb in the reflector.

10. A replaceable rectangular seal beam lamp unit, as defined in claim 9, wherein the halogen bulb is mounted centrally with respect to the paraboloidal mirrorized surface of the reflector, said connectors being positioned at the lower rear portion of the reflector, said connector rods each having a first portion extending forwardly from the bulb lead wires toward the lens, and a second portion extending downwardly and rearwardly toward the connector members in the lower rear portion of the reflector.

11. A replaceable rectangular seal beam lamp unit, as defined in claim 9, including a recess in the rear of the reflector behind the halogen bulb, said halogen bulb wires extending into the recess, and a resilient adhesive in the reflector recess for engaging the bulb wires and resiliently supporting the halogen bulb.

12. A replaceable rectangular seal beam lamp unit, as defined in claim 11, wherein the recess is formed by an integral rim in the interior of the plastic reflector.

13. A replaceable rectangular seal beam lamp unit, as defined in claim 10, wherein the reflector has a generally vertical external mounting surface adjacent the connector members, said terminals being mounted against said reflector mounting surface, said terminals each having at least one opening therethrough, and and a pair of integral projections on the mounting surface extending through the openings in the terminals and holding the terminals to the mounting surface.

14. A replaceable rectangular seal beam lamp unit, as defined in claim 13, including a second opening in each of the terminals, said connector members being eyelets, each having a portion extending through one of the second openings in the terminals to assist in holding the terminals to the mounting surface on the reflector and providing electrical contact therewith.

15. A replaceable rectangular halogen bulb lamp unit, comprising; a plastic reflector having a paraboloidal reflective inner surface, a rectangular lens fixed to the reflector, a halogen bulb in the reflector having a pair of lead wires extending rearwardly therefrom, a recess in the rear of the reflector, said bulb lead wires extending into the recess, a resilient adhesive in the recess engaging the lead wires to resiliently support the halogen bulb, a pair of connectors in the lower rear portion of the reflector, a pair of external terminals connected to the connectors, a pair of curved spring connector rods connected at one end to the bulb lead wires and at their other ends to the connectors to resiliently support and provide a conductive path to the halogen bulb, and a support member between one of the rods and the halogen bulb.

16. A replaceable rectangular halogen bulb lamp unit, as defined in claim 15, wherein the reflector has a generally vertical external mounting surface adjacent the connectors, said terminals being mounted against said reflector mounting surface, said terminals each having at least one opening therethrough, a pair of integral projections on the mounting surface extending through the openings in the terminals and holding the terminals to the mounting surface, and a second opening in each of the terminals, said connectors being eyelets each having a portion extending through one of the second openings in the terminals to assist in holding the terminals to the mounting surface on the reflector and providing electrical contact therewith.

17. A replaceable rectangular seal beam lamp unit, comprising; a plastic reflector having an interior mirrorized paraboloidal reflective surface, a lens mounted on the reflector, a halogen bulb adapted to be mounted in the reflector having at least a pair of lead wires extending rearwardly therefrom, a pair of connector members mounted in the rear of the reflector, connector means connecting the connector members to the lead wires, a pair of terminals on the outside of the reflector connected to the connector members, said reflector having a generally vertical external mounting surface adjacent the connector members, said terminals being mounted against said reflector mounting surface, said terminals each having at least one opening therethrough, and a pair of integral projections on the mounting surface extending through the openings in the terminals and holding the terminals to the mounting surface.

18. A replaceable rectangular seal beam lamp unit, as defined in claim 17, including a second opening in each of the terminals, said connector members being eyelets, each having a portion extending through one of the second openings in the terminals to assist in holding the terminals to the mounting surface on the reflector and providing electrical contact therewith.

19. A replaceable halogen bulb lamp unit, comprising; a plastic reflector having a paraboloidal reflective surface, a forwardly opening rectangular recess in the reflector, one side of the recess being formed by an integral forwardly projecting hood on the reflector, a rectangular lens closing the reflector, said lens having a flange seated in the rectangular recess in the reflector, epoxy adhesive in the recess holding the lens in position in the reflector, a halogen bulb mounted in the reflector having a pair of lead wires extending rearwardly therefrom, a recess in the rear of the reflector formed by an integral flange, a synthetic rubber material in the recess engaging the bulb lead wires to position and assist in resiliently supporting the halogen bulb, a pair of connector openings in the lower rear portion of the plastic reflector, a generally vertical mounting surface on the exterior of the reflector surrounding the connector openings, a pair of eyelet connectors extending through the connector openings in the reflector, a pair of terminals having openings therein mounted on the reflector mounting surface with their openings receiving the eyelet connectors, said eyelets being rolled over against the terminals to hold them in position, a second opening in each of the terminals, said reflector having integral posts extending from the mounting surface through the second opening in each of the terminals to assist in holding the terminals in position, a pair of curved resilient spring rods connected at one end of the bulb lead wires and at their other ends to the eyelet connectors to provide a conductive path between the terminals and the bulb, and a support strap connected to the halogen bulb and only one of the curved rods to assist in providing a resilient support for the halogen bulb in the reflector.

* * * * *